Dec. 9, 1958 M. B. RASMUSSON 2,863,403
AUTOMATIC DEFROSTER
Filed Oct. 17, 1955 3 Sheets-Sheet 1

INVENTOR.
MARLIN B. RASMUSSON
BY Lothrop & West
ATTORNEYS

Dec. 9, 1958 M. B. RASMUSSON 2,863,403
AUTOMATIC DEFROSTER
Filed Oct. 17, 1955 3 Sheets-Sheet 2
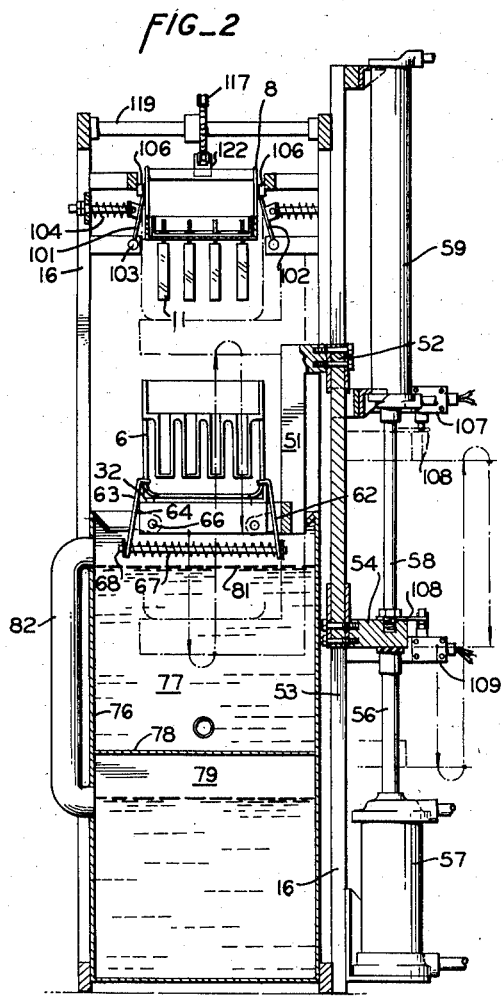
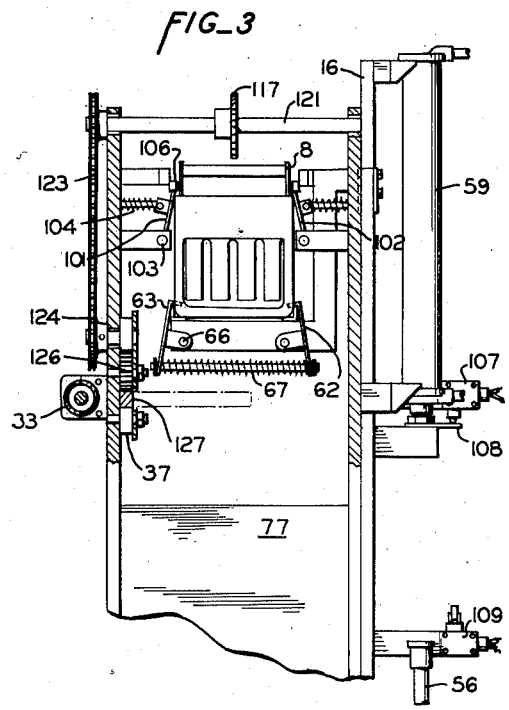
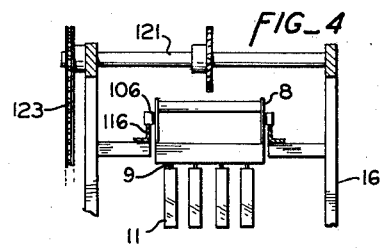
INVENTOR.
MARLIN B. RASMUSSON
BY *Lothrop & West*
ATTORNEYS

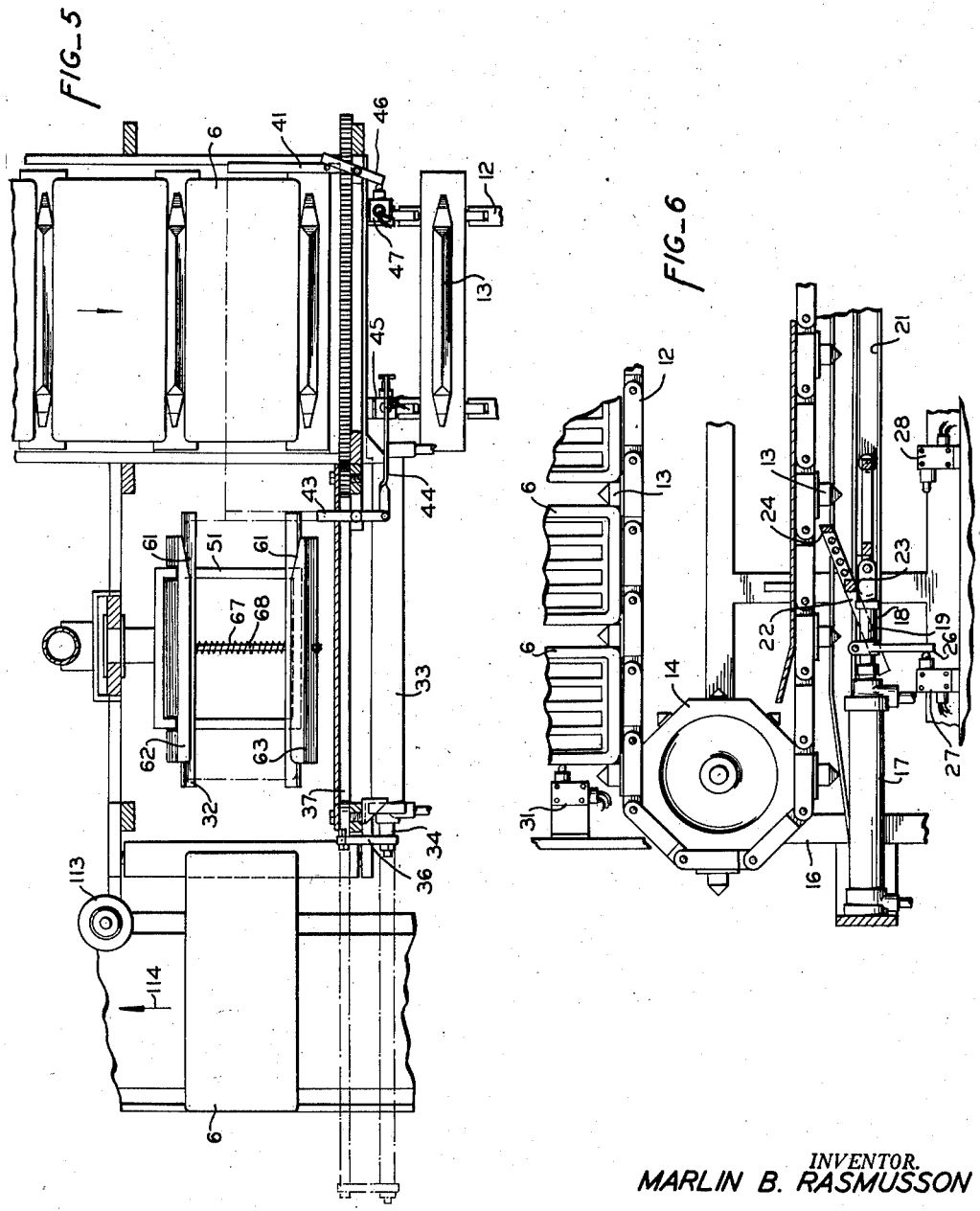

United States Patent Office 2,863,403
Patented Dec. 9, 1958

2,863,403

AUTOMATIC DEFROSTER

Marlin B. Rasmusson, Sacramento, Calif.

Application October 17, 1955, Serial No. 541,013

7 Claims. (Cl. 107—8)

My invention relates to means for handling large quantities of stick-confections, such as ice cream frozen on a stick or water ice frozen on a stick. In the process of quantity manufacture of such stick-confections, the confections are frozen around the sticks while contained in a mold immersed in a brine tank with the sticks being retained firmly in a stick holder which is a separate mechanism carried by the mold. A structure of this sort is shown in my copending application entitled Automatic Stick-Confection Mechanism filed October 17, 1955 with Serial Number 541,012. The present invention has to do with a mechanism for automatically making it possible to separate the confections and their contained sticks from the molds.

The present invention relates particularly to an automatic structure for freeing the stick holders together with the secured sticks and the confections frozen thereon from the molds in which they were frozen and for dispatching the molds and the detached parts separately for further handling.

It is an object of my invention to provide a defroster which will serve with substantially standard molds and stick holders quickly to permit detachment thereof and further handling of the separated components.

Another object of my invention is to provide an automatic defroster which can be operated cyclically in connection with attendant automatic machinery.

A still further object of my invention is to provide a stick holder in which the defrosting operation is quickly and uniformly carried out.

A still further object of my invention is to provide an automatic defroster capable of operating as an individual unit or in combination with other automatic mechanisms.

A still further object of my invention is to provide an automatic defroster of a sanitary and trouble-free nature so that handling of the stick-confections and their attendant structure is largely carried out without human supervision or intervention.

A still further object of my invention is to provide an automatic defroster that is mechanically easy to construct and to service and is economical to manufacture and use.

A still further object of the invention is, in general, to provide an improved automatic defroster.

While the defroster can be incorporated in a number of different forms depending upon the different confections to be handled and the particular environment in which it is utilized, it has successfully been incorporated as described in the accompanying description and as shown in the accompanying drawings.

In the drawings, Figure 1 is a side elevation of an automatic defroster constructed in accordance with my invention, certain parts being shown in cross section on a transverse, vertical plane.

Figure 2 is a cross section, the plane of which is indicated by the line 2—2 of Figure 1.

Figure 3 is a detailed cross section, the plane of which is indicated by the line 3—3 of Figure 1.

Figure 4 is a detailed cross section, the plane of which is indicated by the line 4—4 of Figure 1.

Figure 5 is a plan with certain parts in cross section on a plane indicated by the line 5—5 of Figure 1.

Figure 6 is a cross section, the plane of which is indicated by the line 6—6 of Figure 1.

Figure 1:
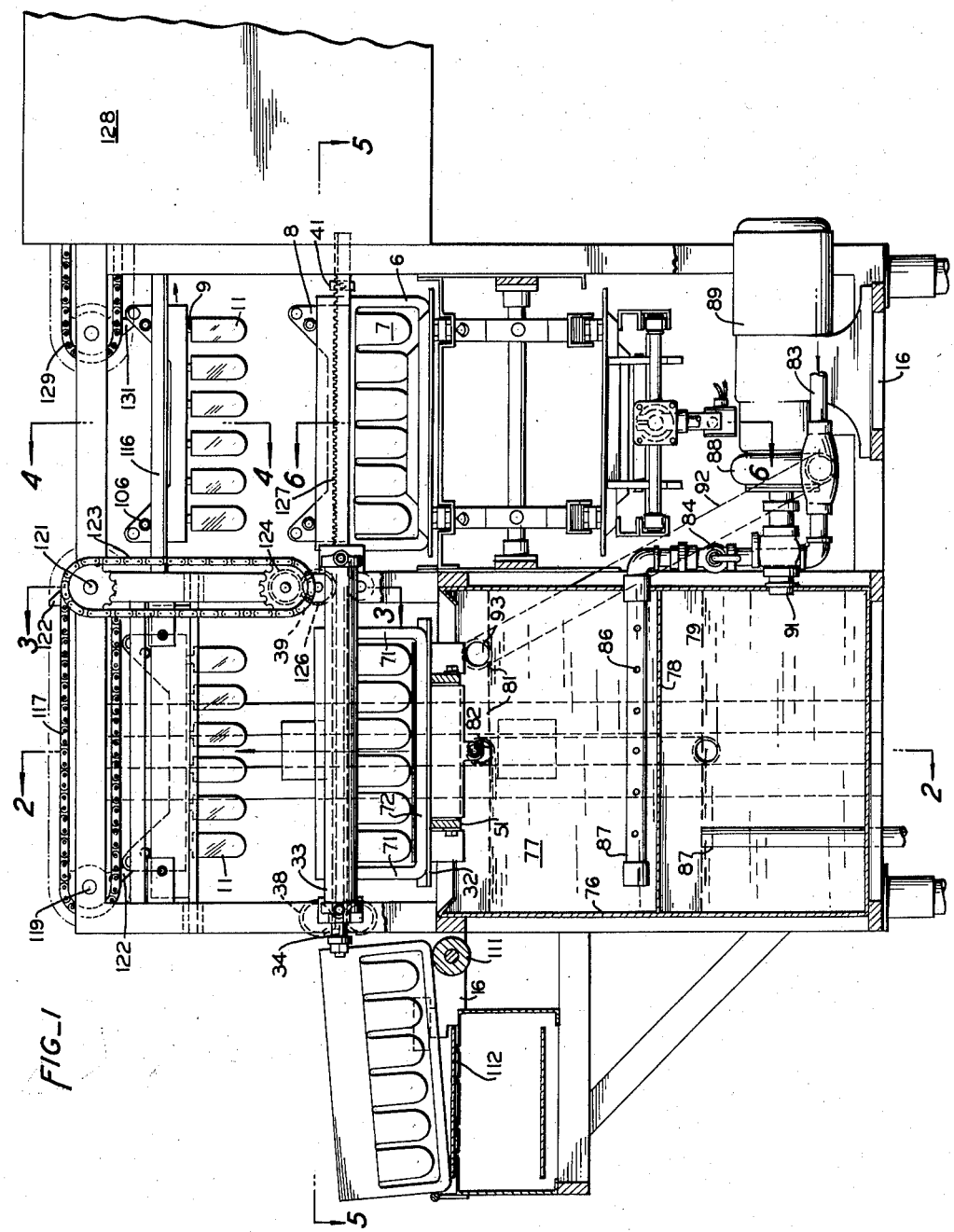

The automatic defroster is primarily for use in connection with a stick-confection mold 6 which usually comprises a metal frame having a plurality of mold cavities 7 therein. Separate from the mold but detachably resting therein during the confection freezing operation is a stick holder 8 having the ability to retain a plurality of confection sticks 9 therein. The frozen confections 11 encase the sticks 9 and have substantially the configuration of the cavities 7. As shown particularly in Figure 6 a succession of combined molds 6 with stick holders and frozen confections arrive at the automatic defroster on a conveyor chain 12 having cleats 13 thereon separating the successive mold and stick holder combinations. The conveyor is trained around a sprocket structure 14 suitably mounted on the frame 16 of the defroster. Preferably the conveyor 12 is cyclically or periodically advanced and that is accomplished by a pneumatic cylinder 17 also mounted on the frame 16 and having a carriage 18 operated by a piston rod 19 extending from the cylinder 17. The carriage operates in a channel 21 on the frame 16 and carries an unbalanced pawl lever 22 joined to the carriage by a pivot connection 23. Normally, the trailing end of the pawl lever 22 is gravitally depressed so that the leading end 24 thereof comes into contact with a cleat 13 on the conveyor when the piston rod 19 is projected.

A depending lug 26 on the piston rod 19 in the retracted position thereof is in engagement with a switch 27. This switch controls communication between a source of pneumatic fluid under pressure and the cylinder 17, being effective when energized to cause the piston rod to be projected and through the pawl lever to advance the conveyor 12. When a suitable advancement has been accomplished, the lug 26 actuates another switch 28 likewise in the pneumatic circuit to the cylinder 17 so that the connections are reversed and the cylinder retracts the piston rod to its position as shown in Figure 6, ready for a subsequent cycle. By operation of the switches 27 and 28 (which are usually included also in circuit with any attendant feeding mechanisms supplying the mold 6 and the stick assembly) the conveyor is cyclically advanced so that the molds are successively presented in an appropriate location on the automatic defroster frame 16.

The leading mold 6 when it has advanced to an appropriate position on the frame engages a switch 31 in the circuit with the switches 27 and 28 so that no further advancement takes place until the leading mold 6 has been dislodged. Thereupon the next mold 6 is advanced one cycle.

Means are provided for advancing the leading mold 6 from the conveyor 12 to a subsequent station for further handling. The subsequent station is on an elevator platform 32 (Figure 2). The advancing mechanism for the combined mold and stick holder includes a pneumatic cylinder 33 mounted on the frame 16 and having a piston rod 34 projecting from one end thereof. The piston rod is connected by a cross strap 36 to one end of a slide bar 37 extending across the frame 16 and guided for rectilinear motion between pairs of flanged rollers 38 and 39. At its unattached end, the slide bar 37 is provided with a laterally projecting push rod 41 disposed immediately to the rear of the leading mold 6 on the conveyor 12. The cylinder 33 when appropriately actuated by compressed air under control of the switch 31 is effective to project the piston rod 34 and to carry the bar 37 along so that the rod 41 pushes the leading mold 6 and its contained stick holder between the cleats 13 on the conveyor 12 over a small intervening space and onto the elevator platform 32.

In the forward position of the bar 41 with the mold 6 on the elevator platform, the bar contacts a depending part of a rocker lever 43 pivoted on the frame and through a link 44 actuates a switch 45 which reverses the pneumatic connections to the cylinder 33 so that the forward movement of the rod 41 is arrested and, in fact, the bar is returned to its original position, as shown in Figure 5. At that position, the bar 41 through a rocker lever 46 on the farme 16 actuates a switch 47 so that the pneumatic connections are again reversed and the cylinder 33 is made ready for a subsequent operation. The subsequent operation, however, cannot occur until the switch 31 is energized by the presence of a successive mold 6 in the leading position, as shown in Figure 6.

The elevator platform 32 is part of an elevator framework 51 having a connection to a slide 52 arranged to move vertically in the frame on the frame 16 by reason of appropriate guides 53 thereon. The slide 52 extends along the guides and then projects in a cross head 54 overlying the upper end of a piston rod 56 projecting from a piston 57 secured to the frame 16. Also, the cross head 54 is connected to a piston rod 58 depending from a cylinder 59 secured to the frame 16 in axial alignment with the cylinder 57. The cylinder 59 has a longer stroke than the cylinder 57 but is of lesser diameter. The effect of the two cylinders 57 and 59 is to hold the platform 32 in a central position substantially co-planar with the conveyor 12 during one part of the operating cycle. This is true while the mold and assembled stick holder is being transferred from the conveyor to the elevator platform.

During the transfer, the mold 6, in advancing, cams against the inclined or tapered leading portion 61 of a pair of channels 62 and 63 having projecting flanges 64 connected by pivots 66 to the elevator platform 32. These channels 62 and 63 are normally urged toward each other by an expansion spring 67 surrounding a rod 68 loosely passing through the depending portions of the channels. As the mold 6 advances therebetween, the channels 62 and 63 are spread apart but since the mold includes a skeleton frame having open sides between uprights 71 at the opposite ends thereof, the channels 62 and 63, although initially cammed apart by the leading uprights 71, then spring back between the posts. The channel flanges then overlie the lower rails 72 on the sides of the mold when the mold is in proper position on the elevator platform 32 and, thus, the channels 62 and 63 constitute grips to hold the mold centrally and longitudinally in position on the elevator platform 32. With the mold in such position the elevator platform is lowered.

In putting the mold in position, the bar 41 trips the switch 45 which is thus effective to actuate the cylinders 57 and 59 so that the elevator platform 32 is lowered by descent of the slide 52. The lowering elevator platform with the mold and attendant stick holder gripped in position thereon descends into a hot water tank 76 mounted on the frame 16 and having an upper compartment 77 defined by a cross wall 78 and having a lower compartment 79 below. The upper compartment 77 is filled with hot water to the level 81 established by an overflow duct 82 disposed at that level and affording access to the lower compartment 79.

The water in the upper tank 77 is maintained at the appropriate temperature by steam supplied from a suitable source through a pipe 83 passing through a control valve 84 and out through perforations 86 in a pipe 87 situated along the bottom portion of the compartment 77. The steam not only serves to maintain the water at the proper temperature but serves also as a make-up water supply. Consequently, overflow from the duct 82 into the storage chamber 79 maintains a level in such a storage chamber subject only to discharge from the system through a stand pipe 87.

As the elevator platform 32 and its burder descend into the compartment 77, there is a displacement of a substantial quantity of water from the upper compartment 77 through the overflow pipe 82 into the lower compartment 79 and it is necessary to return this displaced volume of water for use in the next cycle. This is accomplished by a pump 88 driven by an electric motor 89 on the frame 16 receiving water through an inlet 91 in the compartment 79 and discharging through a pipe 92 leading to an opening 93 in the upper part of the compartment 77. In this way the water is recirculated so that the amount displaced in one cycle is made up between cycles. The compartment 77 is at the appropriate times adequately supplied with water to the level 81.

As the mold 6 and its attendant mechanism descend with the elevator platform into the hot water, the mold is heated and some of the immediately contacting confection is melted. There is thus no longer a close adhesion between the confection and the mold. At the end of a predetermined time of immersion, the connections to the cylinders 57 and 59 are reversed and the elevator platform 32 is raised from its lower position within the compartment 77 up to its central position as shown in Figure 2. At this point, the helper cylinder 57 reaches the end of its stroke and stops. It is desired, however, that the elevator platform 32 continue to rise and therefore the cylinder 59 continues to be effective to lift the slide 52 from the central position to an upper position above the central position.

As the elevator platform 32 with its attached mold and stick holder therein approaches the uppermost position, the sides of the stick holder 8 pass between a pair of latch plates 101 and 102. These are connected by pivots 103 to the frame 16 and normally are pressed by springs 104 toward each other. Preferably, the stick holder 8 is provided with side lugs 106 at appropriate locations and of appropriate disposition so that the lugs on the upward stroke pass between and spread apart the latch plates 101 and 102. The stick holder at the uppermost portion of its stroke is at an elevation so that the lugs 106 are just above the upper edges of the latch plates 101 and 102 which thereupon spring into position, as shown in Figure 2, beneath the lugs.

In its uppermost position, the elevator frame 51 is stopped since a switch 107 on the frame 16 is contacted by a projection 108 on the cross head 54. The connections to the cylinder 59 are thus reversed and the elevator platform 51 then descends from its uppermost position to its central position, at which the cross head 54 is stopped by the engagement of the projection 108 with a switch 109. During the descent of the elevator platform 32, the mold 6 is detached from the stick holder as the stick holder is then supported entirely by the lugs 106 and the latch plates 101 and 102. Consequently, a separation of the stick holder and its attached confections is made from the mold 6. The mold, on the elevator platform 32 in its central location again, but now empty is in the path of a successive mold. When the next succeeding mold 6 is advanced by the next cycle of the bar 41, the leading mold 6 is displaced from the elevator platform 32 and is discharged over a roller 111 on the frame 16 onto a discharge belt conveyor 112. This turns the mold about a guide wheel 113 and carries it off in the direction of the arrow 114, in Figure 5, so that the empty mold is available for reuse.

The stick holder with its attached confections suspended by the lugs 106 on the latch plates 101 and 102 is advanced to a subsequent station. On the framework 16 are side rails 116 substantially in line with the upper edge of the latch plates 101 and 102 and effective to underlie the lugs 106 on the stick holder.

To advance the stick holder from its upper position immediately above the elevator platform 32 into a succeeding position, there is provided a chain conveyor 117 trained around sprockets mounted on cross shafts 119 and 121 journaled in the frame. On the chain 117 at appropriate intervals are driving lugs 122 arranged to engage the trailing edge of a stick holder 8 above the elevator platform. The conveyor 117 is driven in properly timed relationship by a chain 123 extending from the shaft 121 to an idler sprocket 124. This is driven (Figure 3) by a gear train 126 having engagement with a rack 127 formed by teeth in the upper edge of the slide bar 37. The effect of this connection is that when the bar 41 is effective to advance a filled mold toward the elevator platform, simultaneously the conveyor 117 is cyclically driven so that the lug 122 moves the adjacent stick holder 8 from its position above the elevator platform 32 into a new position above the conveyor 12 and with the stick holder supported by its lugs 106 resting on the through rails 116.

The rails 116 extend into a chilling chamber 128 or other appropriate structure and the stick holder 8 above the conveyor 12 is subsequently advanced by an additional conveyor 129 having lugs 131 engaging the stick holder for that purpose. The conveyor 129 is separately driven and is effective to remove the stick holder from the position above the conveyor 12 for further operation. There is usually provided an electrical interlock so that the mechanism cannot cycle until the stick holder has been removed by the conveyor 129.

There has thus been provided in accordance with my invention a device which has means for receiving a filled mold and stick holder combination, for thawing the attachment between the mold and the confections, for separating the mold and the confections, for sending the mold on for further use and for sending the stick holder and its attached sticks and confections for further use, together with means for heating a tank for defrosting and for maintaining an appropriate liquid level in the tank, all together providing an automatic defroster.

What is claimed is:

1. An automatic defroster comprising a frame, an elevator platform, means on said frame for moving said elevator platform between a central position and a lower position below said central position, means on said frame for moving said elevator platform between said central position and an upper position above said central position, means on said frame for advancing a combined mold and stick holder onto said platform in said central position, means for retaining said mold on said platform against vertical dislodgement, a hot water tank fixed on said frame in a position to receive said elevator platform with a combined mold and stick holder thereon with said mold at least partly submerged when said elevator platform and said combined mold and stick holder are in said lower position, means on said frame for retaining said stick holder against vertical dislodgement when said elevator platform and said combined mold and stick holder are in said upper position, and means on said frame for horizontally advancing said stick holder from said retaining means.

2. An automatic defroster comprising a frame, a hot water tank on said frame, an elevator platform on said frame, means on said frame for moving said elevator platform between a central position above said tank and a lower position in said tank, means on said platform for retaining a combined mold and stick holder thereon against vertical dislodgement with said mold in position to be at least partly submerged when said elevator platform is in said lower position, means on said frame for advancing a combined mold and stick holder onto said platform in said central position and into engagement with said retaining means, means on said frame for moving said elevator platform between said central position and an upper position above said central position, means on said frame for retaining against vertical dislodgement the stick holder portion of a combined mold and stick holder on said elevator platform in said upper position, and means on said frame for horizontally advancing said stick holder from said retaining means.

3. An automatic defroster comprising a frame, a heater on said frame in a lower position, means for advancing a combined mold and stick holder onto said frame into a central position above said lower position, means for lowering said combined mold and stick holder into said lower position and then raising said combined mold and stick holder into an upper position above said central position, means in said upper position for supporting said stick holder, means for pulling said mold out of said upper position, and means effective after said mold is out of said upper position for advancing said stick holder.

4. An automatic defroster comprising a frame, means for placing a combined mold and stick holder in an initial position on said frame, an elevator on said frame, means for moving said elevator on said frame from a central position to a lower position then upwardly through said central position to an upper position and then downwardly from said upper position to said central position, means on said frame for moving said combined mold and stick holder from said initial position onto said elevator in said central position, a hot water tank fixed on said frame in a position to receive said elevator with said combined mold and stick holder thereon with said mold at least partly submerged when said elevator and said combined mold and stick holder are in said lower position, and means on said frame for engaging and supporting said stick holder when said elevator with said combined mold and stick holder thereon is in said upper position.

5. An automatic defroster comprising a frame, means for placing a combined mold and stick holder in an initial position on said frame, an elevator on said frame, means for moving said elevator on said frame downwardly from a central position to a lower position then upwardly through said central position to an upper position and then downwardly from said upper position to said central position, means on said frame for advancing said combined mold and stick holder from said initial position onto said elevator in said central position, a hot water tank fixed on said frame in a position to receive said elevator with said combined mold and stick holder thereon with said mold at least partly submerged when said elevator and said combined mold and stick holder are in said lower position, means on said frame for engaging and retaining said stick holder when said elevator with said combined mold and stick holder thereon is in said upper position, means on said frame for discharging said stick holder from said retaining means, and means on said frame for receiving a mold discharged from said elevator in said central position.

6. An automatic defroster comprising a frame, a hot water tank fixed within the lower portion of said frame, an elevator platform on said frame, a pair of grips on said elevator platform for retaining a mold thereon against vertical dislodgement, means on said frame for horizontally dislodging a mold from said elevator platform and for horizontally advancing a combined mold and stick holder onto said elevator platform into engagement with said grips, means for lowering said elevator platform into a lower position within said water tank in which said mold is at least partly submerged in hot water in said tank, means for raising said elevator platform into an upper position above said hot water tank, means on said frame effective when said elevator platform is in said upper position for retaining said stick holder in said upper position, and means on said frame for horizontally advancing said stick holder from said retaining means when said elevator platform is out of said upper position.

7. An automatic defroster comprising a frame, a heater fixed in a lower position on said frame, means on said frame for lowering a combined mold and stick holder into a first lower station in thermal relationship with said heater, means on said frame for lifting said combined mold and stick holder out of thermal relationship with said heater into a subsequent upper station, means on said frame at said subsequent upper station for pulling said mold and said stick holder apart, means on said frame for returning only said mold toward said first lower station, and means on said frame effective after said returning means is effective upon said mold for discharging only said stick holder from said frame.

References Cited in the file of this patent

UNITED STATES PATENTS

| | | |
|---|---|---|
| 1,960,456 | Robb | May 29, 1934 |
| 2,100,031 | Hall | Nov. 23, 1937 |
| 2,614,510 | Heise | Oct. 21, 1952 |
| 2,761,398 | Wiesner | Sept. 4, 1956 |